(12) United States Patent
Han et al.

(10) Patent No.: US 10,196,563 B2
(45) Date of Patent: Feb. 5, 2019

(54) PHOSPHOR POWDER AND METHOD OF MANUFACTURING THE SAME

(71) Applicant: KOREA INSTITUTE OF SCIENCE AND TECHNOLOGY, Seoul (KR)

(72) Inventors: Joon Soo Han, Seoul (KR); So Hye Cho, Seoul (KR); Bok Ryul Yoo, Seoul (KR); Seung Yong Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 164 days.

(21) Appl. No.: 15/178,889

(22) Filed: Jun. 10, 2016

(65) Prior Publication Data

US 2017/0096599 A1    Apr. 6, 2017

(30) Foreign Application Priority Data

Oct. 2, 2015 (KR) .......................... 10-2015-0139182

(51) Int. Cl.
*C09K 11/02* (2006.01)
*C09K 11/56* (2006.01)

(52) U.S. Cl.
CPC .......... *C09K 11/025* (2013.01); *C09K 11/565* (2013.01)

(58) Field of Classification Search
CPC .................................................. C09K 11/025
USPC .................... 252/500; 257/891, 98; 264/299; 528/31; 525/478
See application file for complete search history.

(56) References Cited

U.S. PATENT DOCUMENTS

2009/0085049 A1\* 4/2009 Kolodin ................ H01L 33/501
257/98
2014/0332987 A1\* 11/2014 Kamuro .................. C08L 83/06
257/791

FOREIGN PATENT DOCUMENTS

| KR | 0157971 B1 | 12/1998 |
|---|---|---|
| KR | 10-2013-0062966 A | 6/2013 |
| KR | 10-1497500 B1 | 3/2015 |
| KR | 10-2015-0085594 A | 7/2015 |
| KR | 10-2015-0098443 A | 8/2015 |

OTHER PUBLICATIONS

Korean Office Action dated Jul. 21, 2016 in counterpart Korean Application No. 10-2015-0139182. (5 pages in Korean with partial English translation).

\* cited by examiner

*Primary Examiner* — Monique R Peets
(74) *Attorney, Agent, or Firm* — NSIP Law (57) ABSTRACT

There is provided a phosphor powder which includes a wavelength converting material and a silica-based inorganic substance surrounding the wavelength converting material and represented by the following Formula 1, wherein a content of a hydrosilyl group (Si—H) is greater than or equal to 10 ppm by weight, based on the total weight of the silica-based inorganic substance:

[Formula 1]

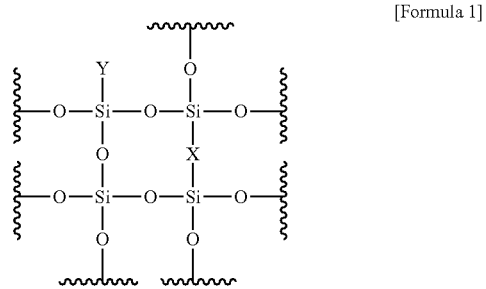

wherein X represents oxygen (O) or an amine group (NH), Y represents hydrogen (H), a hydroxyl group (OH), an amino group ($NH_2$), or an alkyl group containing heteroelements, and the heteroelements include at least one selected from the group consisting of phosphorus (P), nitrogen (N), sulfur (S), oxygen (O), and a halogen element.

15 Claims, 8 Drawing Sheets
(5 of 8 Drawing Sheet(s) Filed in Color)

PHOSPHOR POWDER AND METHOD OF MANUFACTURING THE SAME

CROSS-REFERENCE TO RELATED APPLICATION

This application claims priority to and the benefit under 35 U.S.C § 119 of Korean Patent Application No. 2015-0139182, filed on Oct. 2, 2015, the disclosure of which is incorporated herein by reference in its entirety.

BACKGROUND

1. Field of the Invention

The present invention relates to a phosphor powder including a wavelength converting material and a silica-based inorganic substance, and method of manufacturing the same, and more particularly, to a phosphor powder having improved durability while suppressing a decrease in efficiency of a wavelength converting material by imbedding the wavelength converting material with a silica-based inorganic substance, and a method of manufacturing the same.

2. Discussion of Related Art

Wavelength converting materials are materials that absorb light with certain wavelengths and convert into other wavelengths and, using such characteristics, have been used in light-based devices, sensors, lamps, etc. In a wavelength conversion process, a wavelength converting material absorbs light to move to a transient excited state. The wavelength converting materials in such an excited state are generally susceptible to oxygen or moisture such that a drawback exists in that they may be photobleached when exposed to a light source (light) for a long period of time. Such a drawback of the wavelength converting materials has limited the application thereof to devices including displays, lighting, and the like in which wavelength converting materials are constantly exposed to a light source.

Encapsulants have been used to apply such wavelength converting materials to displays or lighting. In this case, the encapsulants are generally composed of a polymeric material. However, since it is difficult to uniformly disperse the wavelength converting materials (especially in the case of nanophosphors) in such encapsulants, the encapsulants have a problem in that the wavelength converting materials may form aggregations or the wavelength conversion efficiency of the wavelength converting materials may be degraded during a curing process. Also, the encapsulants are very unstable at a high temperature of 200° C. or higher, and their wavelength conversion efficiency may be degraded when oxygen or moisture is not sufficiently kept away, thereby resulting in fatal defects in device performance.

To solve the above problem, methods of coating a wavelength converting material with silica ($SiO_2$) have been proposed (Korean Patent Unexamined Publication Nos. 10-2013-0062966 and 10-2015-0085594). The coating of the wavelength converting material with silica may offer various advantages in the final applications. First, silica that is an inorganic ceramic substance may serve to chemically and physically shield the wavelength converting material from external environments when used as a coating film for the wavelength converting material. Second, bleaching of the wavelength converting material may be reduced since the contact of the wavelength converting material with oxygen and moisture is blocked by the silica coating. Third, the silica coating may allow the wavelength converting material which is susceptible to moisture to be used even in even water or other hydrophilic solvents.

There are two reported methods of coating a wavelength converting material with silica. The first method is a sol-gel method (commonly referred to as Stober method). This is typically a method in which silica coating is performed by a hydrolysis of tetraethyl orthosilicate (hereinafter referred to as 'TEOS') and a condensation of a silica precursor. In this method, an acid or base catalysts is used together. The second method is a microemulsion or reverse microemulsion method. Microemulsion is a method in which small oil drops are dispersed in water used as a solvent, hydrolysis and condensation of TEOS occur at the interface of oil and water stabilized with a surfactant, and a phosphor present in the oil is encapsulated by silica. On the other hand, reverse microemulsion is a method in which small water drops are dispersed in a non-polar solvent and a phosphor is encapsulated by silica in the water drops. The sol-gel method may be used to provide larger silica particles ranging from nano size to micron size, and the (reverse) microemulsion method may be used to provide a silica film to the surface of the phosphor or provide a silica powder having a small size less that is than several tens of nanometer.

Both of the methods use TEOS as a silica precursor and require the use of an organic solvent, an aqueous solution and a catalyst (acid or base) to convert the TEOS into silica. This condition is inevitable in methods in which TEOS is used as a precursor because the TEOS has to undergo hydrolysis and condensation reactions during the conversion of the TEOS into silica. However, such reaction conditions cause surface oxidation and damage to a wavelength converting material to be coated, leading to degraded wavelength conversion efficiency of the wavelength converting material. Also, since the use of water and a polar solvent is required during the conversion of the TEOS into silica, a wavelength converting material to be coated should also be dissolved (or dispersed) in such a solvent. Therefore, wavelength converting materials having a hydrophobic property are generally used after undergoing an additional hydrophilization process of replacing a surface ligand of a wavelength converting material or coating the wavelength converting material with a polar polymer. Also, purification of products obtained after the conversion into silica is required due to the use of an organic solvent, an excessive amount of an aqueous solution and a catalyst. This purification process is generally carried out by washing with an organic solvent such as ethanol, washing with an aqueous solution, and a centrifugation or filtration process. Here, such a purification process may lead to a decrease in yield.

Therefore, there is a demand for a preparation method capable of coating an inorganic substance such as silica while minimizing decreases in efficiency and yield of the wavelength converting material.

SUMMARY OF THE INVENTION

An aspect of the present invention is directed to provide a phosphor powder in which a wavelength converting material is surrounded by a silica-based inorganic substance.

Also, an aspect of the present invention is directed to provide a method of preparing a phosphor powder in which a wavelength converting material is surrounded by a silica-based inorganic substance.

According to an aspect of the present invention, there is provided a phosphor powder which includes a wavelength converting material, and a silica-based inorganic substance surrounding the wavelength converting material and represented by the following Formula 1, wherein a content of a hydrosilyl group (Si—H) is greater than or equal to 10 ppm by weight, based on the total weight of the silica-based inorganic substance:

[Formula 1]

In Formula 1, X represents oxygen (O) or an amine group (NH), Y represents hydrogen (H), a hydroxyl group (OH), an amino group ($NH_2$), or an alkyl group containing heteroelements, and the heteroelements include at least one selected from the group consisting of phosphorus (P), nitrogen (N), sulfur (S), oxygen (O), and a halogen element.

In this case the content of the wavelength converting material may be in a range of 0.0001 to 95% by weight, based on the total weight of the phosphor powder.

By way of an example, the wavelength converting material may include a lanthanide compound or a transition metal compound.

By way of an example, each of the lanthanide compound and the transition metal compound may include at least one selected from the group consisting of a nitrate-based compound, a carbonate-based compound, a halogen-based compound, a sulfate-based compound, an oxide-based compound, a phosphate-based compound, an acetate-based compound, an acetoacetyl-based compound, and a coordinated organic compound.

By way of an example, the wavelength converting material may include an organic phosphor.

By way of an example, the organic phosphor may include at least one selected from the group consisting of an organic monomer, a polymer of the organic monomer, and a combination thereof, and the organic monomer may include at least one selected from the group consisting of an aromatic hydrocarbon, an alicyclic hydrocarbon, a halogenated hydrocarbon, an ether functional group, and a terpene functional group.

By way of an example, the wavelength converting material may include semiconductor nanocrystals having a particle size of 2 to 40 nm.

By way of an example, the semiconductor nanocrystals may include at least one selected from the group consisting of CdTe/CdSe, CdS(Se)/CdTe, CdS(Se)/ZnTe, CuInS(Se)/ZnS(Se), Cu(GaIn)S(Se)/ZnS(Se), ZnTe/CdS(Se), GaSb/GaAs, GaAs/GaSb, Ge/Si, Si/Ge, PbSe/PbTe, PbTe/PbSe, CdTe, CdSe, ZnTe, $CuInS_2$, $CuGaS_2$, $Cu(Ga,In)S_2$, CuGaSnS(Se), CuGaS(Se), CuSnS(Se), ZnS, $CuInSe_2$, $CuGaSe_2$, ZnSe, ZnTe, GaSb, GaAs, Ge, Si, PbSe, PbTe, and PbTe and PbSe.

By way of an example, the wavelength converting material may include an inorganic phosphor powder.

By way of an example, the inorganic phosphor powder may include at least one selected from the group consisting of oxide-based, halogen-based, nitrogen-based and silicate-based phosphor powders.

By way of an example, the phosphor powder may have a spherical shape.

By way of an example, the phosphor powder may have an amorphous shape.

By way of an example, the phosphor powder may have a particle size of 0.01 to 500 μm.

By way of an example, the wavelength converting material and the silica-based inorganic substance may be bonded by a functionalized silane-based coupling agent.

By way of an example, the phosphor powder may have a surface made hydrophobic to be non-polar.

According to another aspect of the present invention, there is provided a method of manufacturing a phosphor powder which includes:

preparing a mixed solution by mixing a silica precursor represented by the following Formula 2, a solvent and a wavelength converting material;

drying the mixed solution to prepare a dried mixture; and curing the dried mixture to prepare a cured mixture:

[Formula 2]

In Formula 2, m and n are in a range of 1 to 500, $R^1$, $R^2$, $R^4$, and $R^5$ are each independently hydrogen, methyl, vinyl, or phenyl, and $R^3$ and $R^6$ are each independently hydrogen, trimethylsilyl, or alkoxysilylpropyl, X is nitrogen (N).

In this case, the solvent may include at least one selected from the group consisting of petroleum, an aromatic solvent, an alicyclic solvent, ether, a halogenated hydrocarbon, a terpene mixture, and a combination thereof.

By way of an example, the mixed solution may further include a curing catalyst, and the curing catalyst may be present at a content of 0.0001 to 10% by weight, based on the total weight of the silica precursor solution.

By way of an example, the curing catalyst may be an organic base catalyst or a metal catalyst.

By way of an example, in preparing the dried mixture, the drying may be performed using at least one method selected from the group consisting of vacuum evaporation, rotary evaporation, centrifugal evaporation, vibrational evaporation, aerosol evaporation, spray evaporation, doctor blade coating, screen coating, spin coating, paint coating, air drying, freeze drying, high-temperature drying, low-pressure drying, low-pressure heating drying, hot-air drying, high-moisture drying, high-temperature/high-moisture drying, and natural drying.

By way of an example, in preparing the cured mixture by curing the dried mixture, the curing may be performed using at least one method selected from the group consisting of room-temperature curing, high-temperature curing, UV curing, and curing using a catalyst.

By way of an example, the mixed solution may further include an alkoxy silane-based coupling agent.

By way of an example, the method may further include pulverizing the cured mixture into a powder.

By way of an example, the pulverizing of the cured mixture into a powder may be performed using at least one method selected from the group consisting of a method using a mortar and a pestle, grinding, milling, wet grinding, ball milling, high-pressure dispersion, and freeze grinding.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings.

Prior to the description, it should be understood that the terms used in the specification and appended claims should not be construed as limited to the general and dictionary meanings but interpreted based on the meanings and concepts corresponding to the technical aspects of the present invention on the basis of the principle that the inventor is allowed to define the terms appropriately for the best explanation. Therefore, the description proposed herein is just a preferable example for the purpose of illustration only, not intended to limit the scope of the invention, so it should be understood that other equivalents and modifications could be made without departing from the scope of the invention.

A phosphor powder according to one exemplary embodiment of the present invention includes a wavelength converting material and a silica-based inorganic substance that surrounds the wavelength converting material and is represented by the following Formula 1, wherein a content of a hydrosilyl group (Si—H) may be greater than or equal to 10 ppm by weight, based on the total weight of the silica-based inorganic substance.

[Formula 1]

In Formula 1, X represents oxygen (O) or an amine group (NH), Y represents hydrogen (H), a hydroxyl group (OH), an amino group ($NH_2$), or an alkyl group containing heteroelements, and the heteroelements include at least one selected from the group consisting of phosphorus (P), nitrogen (N), sulfur (S), oxygen (O), and a halogen element.

The wavelength converting material includes a wavelength down-converting material and a wavelength up-converting material. In this case, the wavelength down-converting material may convert high-energy light into low-energy light, whereas the wavelength up-converting material may convert light of low-energy into light of high-energy.

The content of the wavelength converting material may be in a range of 0.001 to 95% by weight, based on the total weight of the phosphor powder. When the content of the wavelength converting material is less than 0.001% by weight, based on the total weight of the phosphor powder, a wavelength conversion effect may not be realized. On the other hand, when the content of the wavelength converting material is greater than 95% by weight, a protective effect of the wavelength converting material and a durability enhancement effect may be degraded.

The wavelength converting material may include a lanthanide compound or a transition metal compound. Specifically, the lanthanide element may include at least one selected from the group consisting of Ce, Pr, Nd, Sm, Eu, Gd, Tb, Dy, Ho, Er, Tm, and Yb, and the transition metal element may include at least one selected from the group consisting of Sc, Ti, V, Cr, Mn, Fe, Co, Ni, Cu, and Zn. Each of the lanthanide compound and the transition metal compound may include at least one selected from the group consisting of a nitrate-based compound, a carbonate-based compound, a halogen-based compound, a sulfate-based compound, an oxide-based compound, a phosphate-based compound, an acetate-based compound, an acetoacetyl-based compound, and a coordinated organic compound.

The wavelength converting material may include an organic phosphor. Specifically, the organic phosphor may include at least one selected from the group consisting of an organic monomer, a polymer of the organic monomer and a combination thereof, and the organic monomer may include at least one selected from the group consisting of an aromatic hydrocarbon, an alicyclic hydrocarbon, a halogenated hydrocarbon, an ether functional group, and a terpene functional group. More specifically, the organic phosphor may include at least one selected from the group consisting of coumarine, rhodamine, porphyrin, fluorescein, lumogen, and cyanomethylene.

The wavelength converting material may include semiconductor nanocrystals. Specifically, the semiconductor nanocrystals may include at least one selected from the group consisting of CdTe/CdSe (where the symbol "CdTe/CdSe" means that CdTe is present in a core and CdSe is present in a shell), CdS(Se)/CdTe (where the symbol "CdS(Se)" means that some of S in CdS is substituted with Se, provided that the sum of S and Se becomes one equivalent), CdS(Se)/ZnTe, CuInS(Se)/ZnS(Se), Cu(GaIn)S(Se)/ZnS(Se), ZnTe/CdS(Se), GaSb/GaAs, GaAs/GaSb, Ge/Si, Si/Ge, PbSe/PbTe, PbTe/PbSe, CdTe, CdSe, ZnTe, $CuInS_2$, $CuGaS_2$, $Cu(Ga,In)S_2$, CuGaSnS(Se), CuGaS(Se), CuSnS(Se), ZnS, $CuInSe_2$, $CuGaSe_2$, ZnSe, ZnTe, GaSb, GaAs, Ge, Si, PbSe, PbTe, and PbTe and PbSe. Also, the semiconductor nanocrystals may have a particle size of 2 to 40 nm. When the particle size of the semiconductor nanocrystals is less than 2 nm, emission of visible light may be very weak due to a blue shift in which light is shifted from visible wavelengths to UV wavelengths. On the other hand, when the particle size of the semiconductor nanocrystals is greater than 40 nm, the emission of visible light may be very weak due to a red shift in which light is shifted from visible to infrared wavelengths.

The wavelength converting material may include an inorganic phosphor powder. Specifically, the inorganic phosphor powder may include at least one selected from the group consisting of oxide-based, halogen-based, nitrogen-based and silicate-based phosphor powders. More specifically, the inorganic phosphor powder may include at least one selected from the group consisting of $(AE)Ga_2S_4:Eu^{2+}$, $(AE)S:Eu^{2+}$, $(AE)M_2O_4:Eu^{2+}$ (AE may be at least one alkali earth metal selected from the group consisting of Ba, Ca, and Sr, and M may be at least one of Al and Ge), $Y_3Al_5O_{12}:Ce^{3+}$ (hereinafter referred to as "YAG"), $SrAl_2O_4:Eu;Dy$, $LaPO_4:Eu$, $LaVO_4:Eu$, $NaYF_4:Er;Yb$, $NaYF_4:Tm;Yb$, ZnO, $Y_2O_3:Eu$ (and/or Tb), $CaSiAlN_3$, and $SrSN_2$.

Figure 1A:
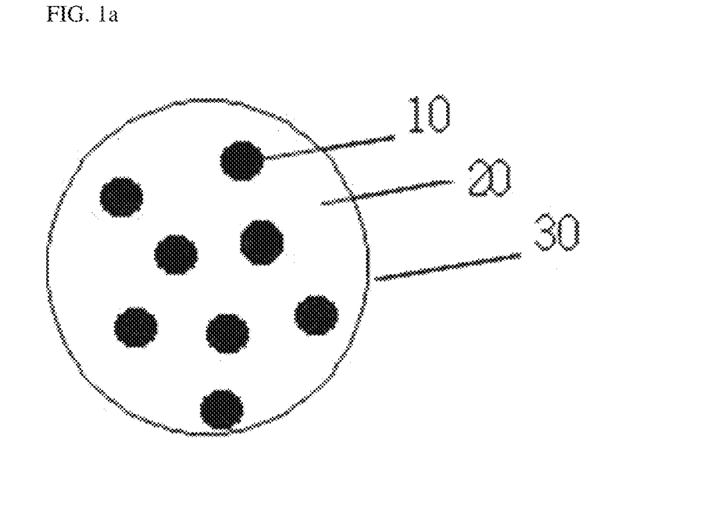
FIGS. 1A and 1B are schematic diagrams showing shapes of a phosphor powder according to one exemplary embodiment of the present invention.
Figure 1B:
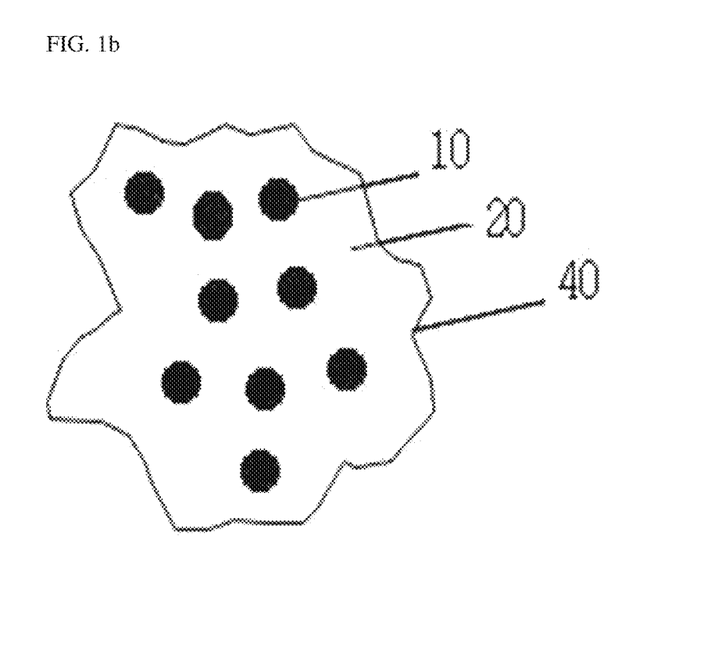

FIGS. 1A and 1B are schematic diagrams showing shapes of a phosphor powder according to one exemplary embodiment of the present invention, however, the shapes of the phosphor powder according to one exemplary embodiment of the present invention are not limited thereto.

Referring to FIG. 1A, a phosphor powder 30 may have a spherical shape in which a wavelength converting material 10 is surrounded by a silica-based inorganic substance 20. Also, referring to FIG. 1B, a phosphor powder 40 may have an amorphous shape in which a wavelength converting material 10 is surrounded by a silica-based inorganic substance 20. When the wavelength converting material 10 is surrounded by the silica-based inorganic substance 20, a shielding property of the phosphor powder 30 against oxygen and moisture may be improved, and heat resistance and chemical resistance may be enhanced. Also, since the phosphor powder 30 has low moisture and oxygen permeability and no yellowing, photobleaching is small even when exposed to a light source including solar radiation, lighting, etc. for a long time, and a decrease in luminous efficiency is small.

The phosphor powder may have a particle size of 0.01 to 500 μm. When the particle size of the phosphor powder is less than 0.01 μm, the phosphor powder may aggregate due to a large specific surface area. On the other hand, when the particle size of the phosphor powder is greater than 500 μm, incident light reaches the surface of a particle but do not reach the central region of the particle, and thus the wavelength converting material included in the central region may not contribute to light emission.

The wavelength converting material and the silica-based inorganic substance may be bonded by a functionalized silane-based coupling agent. Specifically the functionalized silane-based coupling agent may be an alkoxy silane-based coupling agent. More specifically, such a coupling agent may include (trialkoxysilylpropyl)diphenylphosphine oxide, (methyldialkoxysilylpropyl)diphenylphosphine oxide, (trialkoxysilylpropyl)dicyclohexylphosphine oxide, (trialkoxysilylethyl)dicyclohexylphosphine oxide, (3-mercaptopropyl)trialkoxysilane, (3-mercaptopropyl)methyldialkoxysilane, (3-aminopropyl)trialkoxysilane, N-(2-aminoethyl)-3-aminopropyltrialkoxysilane, (3-aminopropyl)methyldialkoxysilane, N-(2-aminoethyl)-3-aminopropylmethyldialkoxysilane, N-(3-ethoxysilylpropyl)-4,5-dihydroimidazole, 3-aminopropyl(methyldialkoxysilane), cyanoethyltrialkoxysilane, methacryloylpropyltrialkoxysilane, (3-acryloylpropyl)trialkoxysilane, 3-isocyanatopropyltrialkoxysilane, etc. Here, an alkoxy generally refers to methoxy or ethoxy. Such organosilane coupling agent may be blended at a content of approximately 0.1 to 50%, based on a phosphor solution to be added. When the organosilane coupling agent is added at a content of less than 0.1%, stability may not be improved. On the other hand, when the organosilane coupling agent is added at a content of greater than 50%, physical and chemical properties of the phosphor powder may be degraded, and a curing rate may be lowered.

To improve adhesiveness and dispersibility when the phosphor powder of the present invention is encapsulated in another base material, the surface of the phosphor powder may be coated with a functionalized silane-based coupling agent. In this case, such a surface functionalization agent may include hexamethyldisilazane, trimethylchlorosilane, vinyltrimethoxysilane, vinyltrichlorosilane, dimethyldichlorosilane, dimethyldialkoxysilane, methyltrichlorosilane, methyltrichlorosilane, vinylmethyldichlorosilane, vinylmethyldialkoxysilane, phenyltrimethoxysilane, phenyltrichlorosilane, methyldichlorosilane, (3-aminopropyl)trialkoxysilane, (3-mercaptopropyl)trialkoxysilane, (3-mercaptopropyl)methyldialkoxysilane, (3-aminopropyl)trialkoxysilane, N-(2-aminoethyl)-3-aminopropyltrialkoxysilane, (3-aminopropyl)methyldialkoxysilane, N-(2-aminoethyl)-3-aminopropylmethyldialkoxysilane, methacryloylpropyltrialkoxysilane, (3-acryloylpropyl)trialkoxysilane, (3-chloropropyl)trialkoxysilane, etc. In this case, the surface of the phosphor powder may be coated using a method such as vapor deposition, spray deposition or solution deposition.

Figure 2:
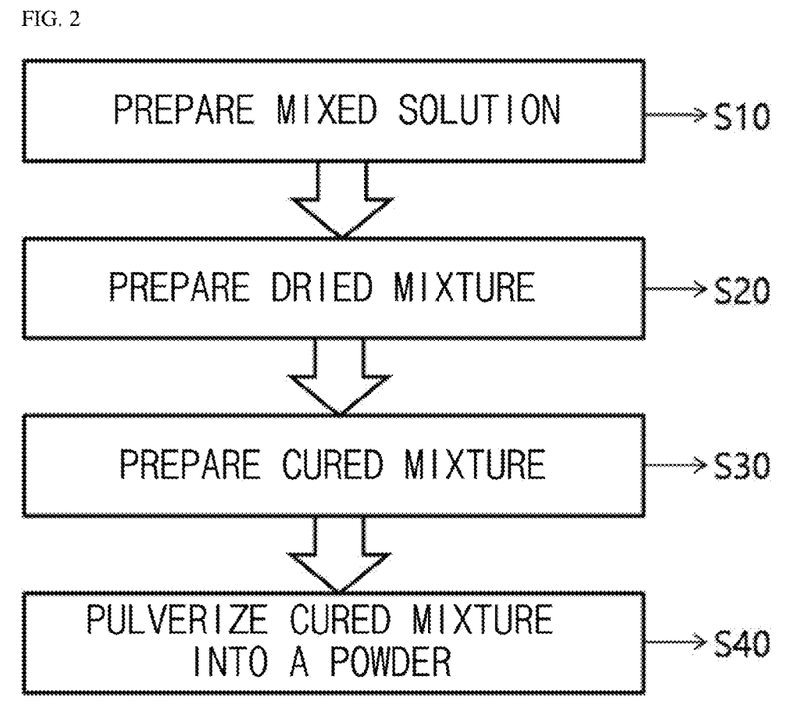
FIG. 2 is a process flowchart showing a method of manufacturing a phosphor powder according to one exemplary embodiment of the present invention.

FIG. 2 is a process flowchart showing a method of manufacturing a phosphor powder according to one exemplary embodiment of the present invention.

Referring to FIG. 2, a method of manufacturing a phosphor powder according to one exemplary embodiment of the present invention may include preparing a mixed solution by mixing a silica precursor represented by the following Formula 2, a solvent and a wavelength converting material (S10), drying the mixed solution to prepare a dried mixture (S20), curing the dried mixture to prepare a cured mixture (S30), and pulverizing the cured mixture into a powder (S40).

[Formula 2]

In Formula 2, m and n are in a range of 1 to 500, $R^1$, $R^2$, $R^4$, and $R^5$ are each independently hydrogen, methyl, vinyl, or phenyl, and $R^3$ and $R^6$ are each independently hydrogen, trimethylsilyl, or alkoxysilylpropyl, X is nitrogen (N).

In S10, a mixed solution may be prepared by mixing a silica precursor represented by Formula 2, a solvent and a wavelength converting material. Also, the mixed solution may include a curing catalyst and/or an alkoxy silane-based coupling agent.

The solvent may include at least one selected from the group consisting of petroleum, an aromatic solvent, an alicyclic solvent, ether, a halogenated hydrocarbon, a terpene mixture, and a combination thereof. The content of the solvent may be properly adjusted according to the thickness or size of a thin film/powder to be formed and thus may be in a range of 1 to 99.9% by weight, based on the total weight of the mixed solution. When the content of the solvent is less than 1% by weight, the risk of fire may arise due to a strong reaction of a coating solution with moisture when the coating solution is exposed to the moisture. On the other hand, when the content of the solvent is greater than 99.9% by weight, the wavelength converting material may not be effectively surrounded by the silica-based inorganic substance.

The curing catalyst may be an organic base catalyst or a metal catalyst. In this case, the content of the curing catalyst may be in a range of 0.0001 to 10% by weight, based on the total weight of the silica precursor solution. When the content of the curing catalyst is less than 0.0001% by weight, the curing catalyst cannot serve as a potent curing agent. On the other hand, when the content of the curing catalyst is greater than 10% by weight, paths of incident light and emitted light may be affected, and thus effective light emission may be hindered, or the stability of the phosphor powder may be degraded.

A solution of polysilazane represented by Formula 2 may be used as the silica precursor. The solution of polysilazane may be used to encapsulate a high concentration of the wavelength converting material since the solution of polysilazane has excellent solubility for the wavelength converting material. The solvent included in the solution is a volatile organic solvent that may be more easily dried compared to a water-soluble solvent. Also, since polysilazanes are hydrolyzed at a highly rapid reaction rate when compared to alkoxysilanes such as TEOS, the polysilazanes may be cured by moisture included in the air to be converted into a silica-based encapsulant. Since such a solution of polysilazane may be converted into a silica-based inorganic substance including the wavelength converting material without using an excessive amount of an aqueous solution or a surfactant, the solution of polysilazane may be used to encapsulate the wavelength converting material without affecting physical properties of the wavelength converting material. Also, there is an advantage in that the polysilazanes may be converted into a crack-free silica-based encapsulant since there is almost no change in volume before and after curing. Also, although a centrifugation process should be performed several times to obtain the silica-coated product when a silica-coated product is obtained using a Stober method or a microemulsion method, a silica-based encapsulant may be easily and directly obtained using the method of manufacturing a phosphor powder according to one exemplary embodiment of the present invention.

In S20, the drying of the mixed solution may be performed using an evaporation method including vacuum evaporation, rotary evaporation, centrifugal evaporation, vibrational evaporation, aerosol evaporation, spray evaporation, and the like, a film deposition method including doctor blade coating, screen coating, spin coating, paint coating, and the like, and a drying method including air drying, freeze drying, high-temperature drying, natural drying, and the like.

In S30, the curing may be performed using at least one selected from the group consisting of room-temperature curing, high-temperature curing, UV curing, and curing using a catalyst.

In S40, the pulverizing of the cured mixture into a powder may be performed using at least one method selected from the group consisting of a method using a mortar and a pestle, grinding, milling, wet grinding, ball milling, high-pressure dispersion, and freeze grinding.

Further, the phosphor powder may have a surface made hydrophobic to be non-polar. The hydrophobic treatment may be performed by exposing the phosphor powder prepared through S10 to S40 to a steam of a hydrophobic agent for a predetermined period of time. The hydrophobic agent may, for example, be hexamethyldisilazane.

Hereinafter, the present invention will be described in further detail with reference to Examples and Comparative Examples thereof. However, the present invention is not limited thereto.

Example 1

Manufacture of Phosphor Powder Including 10% by Weight of Red CdSe Quantum Dots (QDs)

0.6 mL of a CdSe/ZnS solution (commercially available from NanoSquare, Product Number: NSQDs-HOS-620, a solution of 175 mg/mL chloroform) having an emission wavelength of 620 nm and 6.2 mL of a perhydropolysilazane solution (SamSung SDI, Product Number: CISD-15001, a solution of 18.6% by weight of dibutylether) were mixed in a beaker to prepare a mixed solution. Thereafter, the mixed solution was poured into a Teflon-coated container and naturally dried at room temperature for 24 hours while light was blocked out. The dried cured product was gathered, pulverized into a powder using a mortar and a pestle, and then dried at 60° C. for 7 hours and 30 minutes in an oven to manufacture 1 g of a phosphor powder including 10% by weight of red CdSe QDs.

Figure 3:
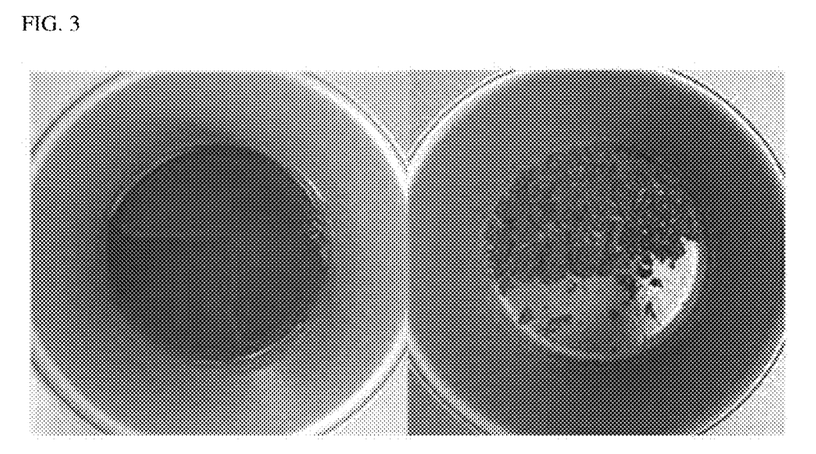
FIG. 3 shows images of a mixed solution (Left panel) and a cured mixture (Right panel) before pulverization during the manufacture of a phosphor powder in EXAMPLE 1.

FIG. 3 shows images of a mixed solution (Left panel) and a cured mixture (Right panel) before pulverization during the manufacture of the phosphor powder in Example 1.

Figure 4:
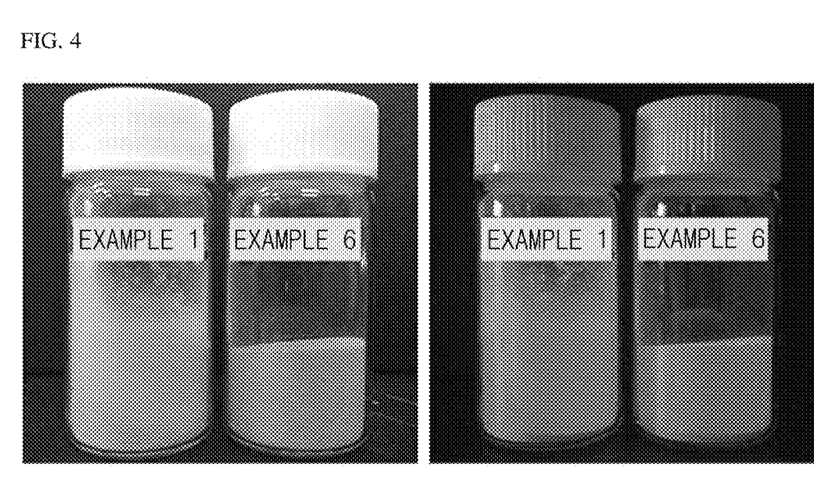
FIG. 4 shows images of phosphor powders of Examples 1 and 6 photographed under visible rays (Left panel) and using a 365 nm UV lamp (commercially available from VilerberLourmat) (Right panel)

FIG. 4 shows images of the phosphor powders of Examples 1 and 6 photographed under visible rays (Left panel) and using a 365 nm UV lamp (commercially available from VilerberLourmat) (Right panel).

Figure 5:
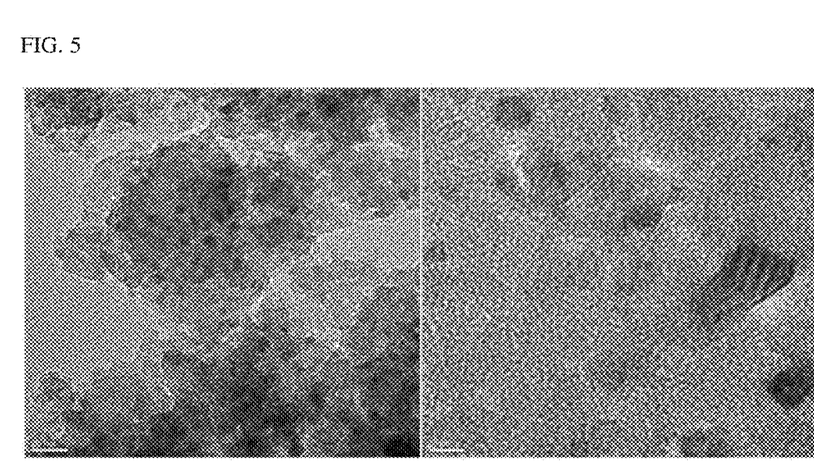
FIG. 5 shows transmission electron microscope images of the phosphor powder prepared in Example 1.
Figure 7:
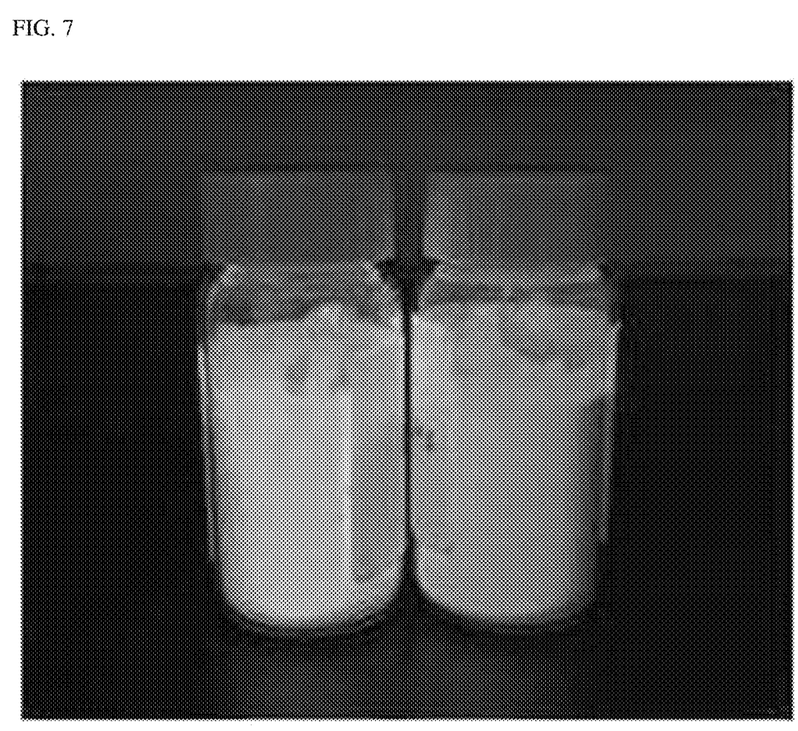
FIG. 7 shows images of phosphor powders of Example 3 (Left panel) and Example 4 (Right panel) photographed using a 365 nm UV lamp (commercially available from VilerberLourmat)

FIG. 5 shows transmission electron microscope images of the phosphor powder prepared in Example 1. A scale bar on the left panel is 20 nm, and a scale bar on the right panel is 5 nm. As shown in FIG. 7, it could be seen that there were spherical CdSe QDs having a lattice pattern, which were uniformly dispersed in silica without being aggregated in the silica.

Example 2

Manufacture of Phosphor Powder Including 7% by Weight of Green CdSe QDs

A phosphor powder was manufactured in the same manner as in Example 1, except that 0.5 mL of a CdSe/ZnS solution (commercially available from NanoSquare, Product Number: NSQDs-HOS-530, a solution of 200 mg/mL chloroform) having an emission wavelength of 530 nm and 7.6 mL of a perhydropolysilazane solution (the same product as the perhydropolysilazane solution used in Example 1) were mixed to prepare a mixed solution.

Figure 6:
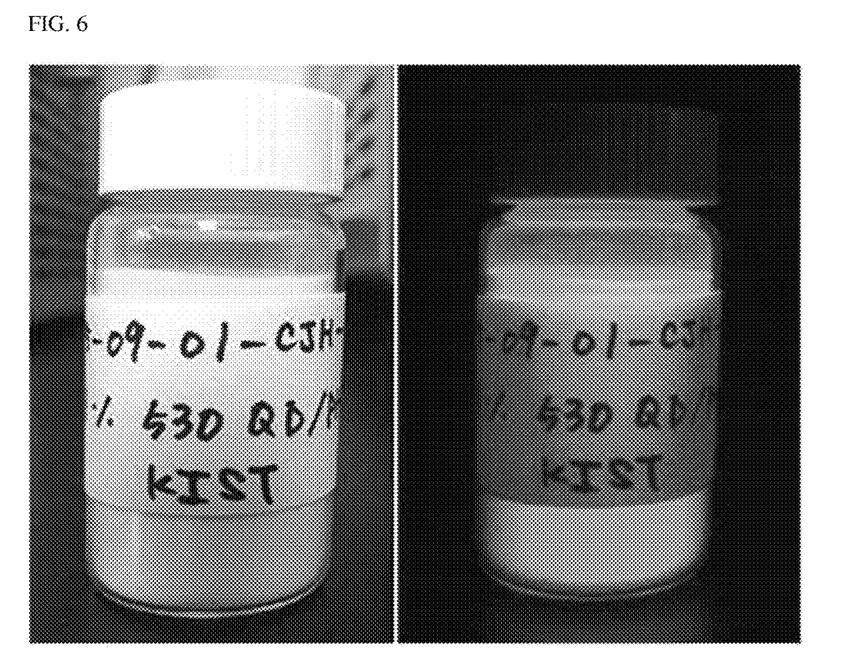
FIG. 6 shows images of a phosphor powder of Example 2 photographed under visible rays (Left panel) and using a 365 nm UV lamp (commercially available from VilerberLourmat) (Right panel)

FIG. 6 shows images of the phosphor powder of Example 2 photographed under visible rays (Left panel) and using a 365 nm UV lamp (commercially available from VilerberLourmat) (Right panel).

Example 3

Manufacture of Phosphor Powder Including 1% by Weight of Green CdSe QDs

A phosphor powder was manufactured in the same manner as in Example 1, except that 0.5 mL of a CdSe/ZnS solution (the same product as the CdSe/ZnS solution used in Example 2) having an emission wavelength of 530 nm and 7.6 mL of a perhydropolysilazane solution (the same product as the perhydropolysilazane solution used in Example 1) were mixed to prepare a mixed solution.

Example 4

Manufacture of Phosphor Powder Including 1% by Weight of Red CdSe QDs

A phosphor powder was manufactured in the same manner as in Example 1, except that 0.4 mL of a CdSe/ZnS solution (the same product as the CdSe/ZnS solution used in Example 1) having an emission wavelength of 620 nm and 45 mL of the perhydropolysilazane solution of Example 1 (the same product as the perhydropolysilazane solution used in Example 1) were mixed to prepare a mixed solution.

FIG. 7 shows images of the phosphor powders of Example 3 (Left panel) and Example 4 (Right panel) photographed using a 365 nm UV lamp (commercially available from VilerberLourmat).

Example 5

Manufacture of Phosphor Powder Including 1% by Weight of Yellow CIS QDs

A phosphor powder was manufactured in the same manner as in Example 1, except that 0.1 mL of a solution including $CuInS_2/ZnS$ having an emission wavelength of 555 nm (manufactured by the present inventors) and 2% hexane (commercially available from Daejung Chemicals & Metals Co., Ltd., Purity: 99% or more) and 1.3 mL of a perhydropolysilazane solution (the same product as the perhydropolysilazane solution used in Example 1) were mixed to prepare a mixed solution.

Example 6

Manufacture of Phosphine Oxide-Functionalized Phosphor Powder Including 10% by Weight of Red CdSe QDs A phosphor powder was manufactured in the same manner as in Example 1, except that 0.5 mL of a CdSe/ZnS solution (the same product as the CdSe/ZnS solution used in Example 1) having an emission wavelength of 620 nm, 5.2 mL of a perhydropolysilazane solution (the same product as the perhydropolysilazane solution used in Example 1), and 0.02 g of (trimethoxysilylpropyl)diphenylphosphine oxide (manufactured by the present inventors) were mixed to prepare a mixed solution.

Example 7

Manufacture of Phosphor Powder Including 10% by Weight of Red CdSe QDs and an Organic Base Catalyst A phosphor powder was manufactured in the same manner as in Example 1, except that 0.5 mL of a CdSe/ZnS solution (the same product as the CdSe/ZnS solution used in Example 1) having an emission wavelength of 620 nm, 5.2 mL of a perhydropolysilazane solution (the same product as the perhydropolysilazane solution used in Example 1), and 0.02 g of an organic base catalyst 4,4'-trimethylene bis(1-methylpiperidine) (Aldrich, Purity: 98%) were mixed to prepare a mixed solution.

Example 8

Manufacture of Mercapto-Functionalized Phosphor Powder Including 10% by Weight of Red CdSe QDs A phosphor powder was manufactured in the same manner as in Example 1, except that 0.5 mL of a CdSe/ZnS solution (the same product as the CdSe/ZnS solution used in Example 1) having an emission wavelength of 620 nm, 5.2 mL of a perhydropolysilazane solution (the same product as the perhydropolysilazane solution used in Example 1), and 0.02 g of (3-mercaptopropyl)trimethoxysilane (Aldrich, Purity: 95%) were mixed to prepare a mixed solution.

Example 9

Non-Polar Treatment of Surface of Phosphor Powder of Example 1

The phosphor powder prepared in Example 1 was exposed to a steam of hexamethyldisilazane (Aldrich, Purity: 99%) at 60° C. for 3 hours and then kept in air at 60° C. for another 3 hours to manufacture a phosphor powder whose surface was non-polarly treated.

Comparative Example 1

Manufacture of Silica ($SiO_2$) Including Wavelength Converting Material Made of TEOS 0.37 mL of a CdSe/ZnS solution (the same product as the CdSe/ZnS solution used in Example 1) having an emission wavelength of 620 nm, 2 mL of ethanol (Daejung Chemicals & Metals Co., Ltd., Purity: 95%), and 0.55 mL of a 30% ammonia solution (Daejung Chemicals & Metals Co., Ltd.) were mixed with 2.0 g of TEOS (Aldrich, Purity: 98%) to prepare a mixed solution, and the mixed solution was naturally dried in air for 24 hours while light was blocked out. A powder was obtained after the natural drying, and the resulting powder was then thermally treated at 60° C. for 7 hours and dried at room temperature for 24 hours under a vacuum (1 mmHg) to obtain a phosphor powder including 10% by weight of red CdSe QDs.

Figure 8:
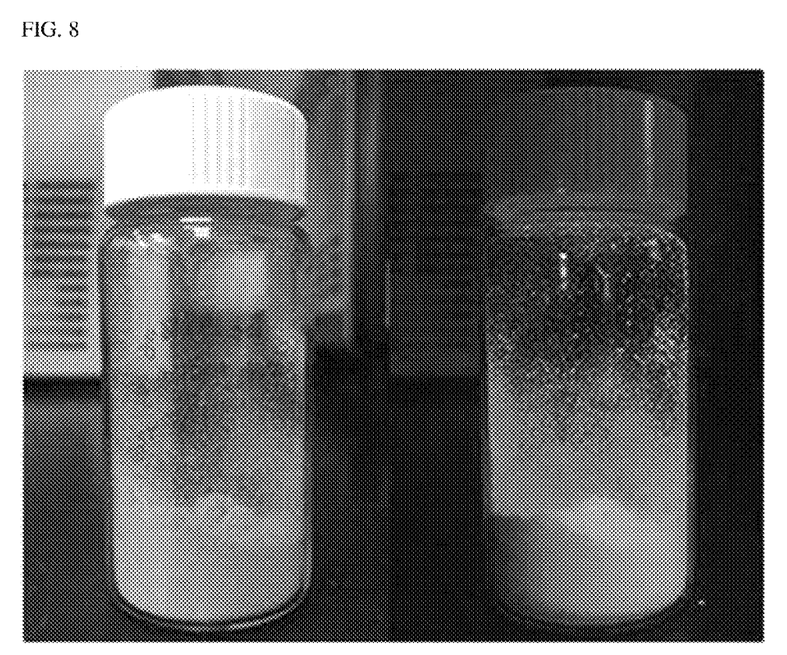
FIG. 8 shows images of a phosphor powder of Comparative Example 1 photographed under visible rays (Left panel) and using a 365 nm UV lamp (commercially available from VilerberLourmat) (Right panel)

FIG. 8 shows images of the phosphor powder of Comparative Example 1 photographed under visible rays (Left panel) and using a 365 nm UV lamp (commercially available from VilerberLourmat) (Right panel).

Evaluation Example 1

Comparison of Photoluminescence Characteristics

To check photoluminescence characteristics of the phosphor powder, the phosphor powder was put into a powder cell, and the photoluminescence spectra of the phosphor powder were analyzed using a photoluminescence spectrometer (commercially available from Hitachi Ltd., Model Name: F-7000). Measurements were performed using an excitation light source with a fixed wavelength of 400 nm.

Figure 9:
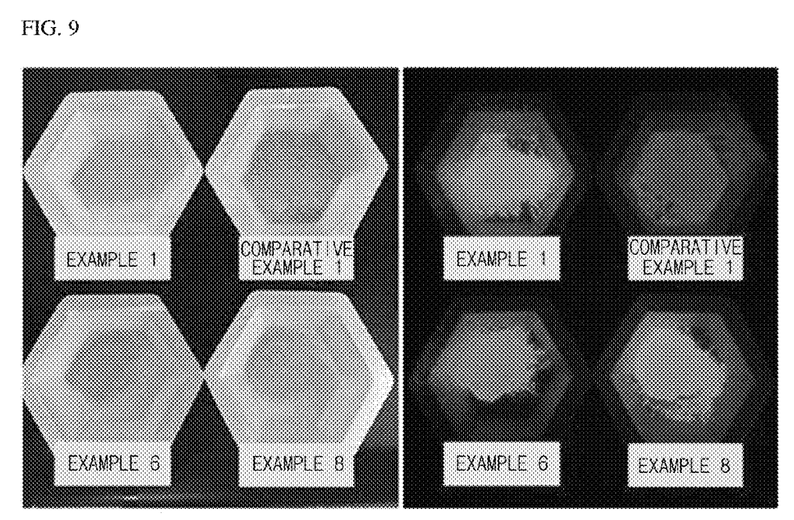
FIG. 9 shows images of phosphor powders of Example 1, Comparative Example 1 and Examples 6 and 8 photographed under visible rays (Left panel) and using a 365 nm UV lamp (commercially available from VilerberLourmat) (Right panel)

FIG. 9 shows images of phosphor powders of Example 1, Comparative Example 1 and Examples 6 and 8 photographed under visible rays (Left panel) and using a 365 nm UV lamp (commercially available from VilerberLourmat) (Right panel). In the case of Comparative Example 1, it could be seen that the color purity of the phosphor powder under visible rays was not high.

Figure 10:
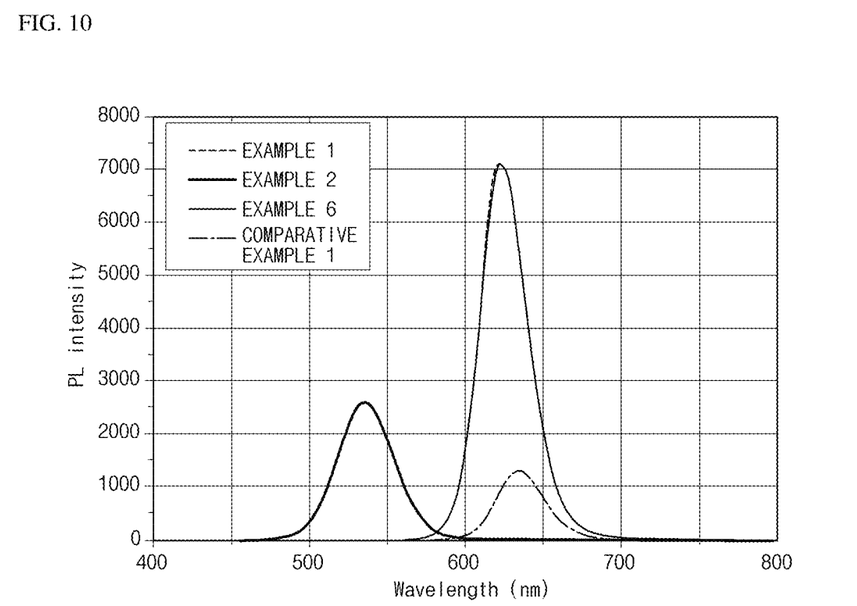
FIG. 10 is a graph plotted by comparing photoluminescence characteristics of the phosphor powders prepared in Examples 1, 2 and 6 and Comparative Example 1.

FIG. 10 is a graph comparing photoluminescence characteristics of the phosphor powders prepared in Examples 1, 2 and 6 and Comparative Example 1. Referring to FIG. 10, it could be seen that the phosphor powders of Examples 1 and 6 had superior photoluminescence characteristics to that of Comparative Example 1, and that the emission wavelengths of the phosphor powder of Comparative Example 1 were relatively short, and red-shifted.

Evaluation Example 2

Comparison of Infrared Spectrum Characteristics

To check infrared spectrum characteristics of the phosphor powder, the infrared spectra of the phosphor powder were analyzed using an infrared spectrometer (commercially available from Bruker, Inc., Model Name: Alpha). KBr pellets were prepared and used for transmission measurements, and attenuated total reflectance (ATR) measurements were performed using a diamond ATR accessory (commercially available from Bruker, Inc., Model Name: PlatinumATR).

Figure 11:
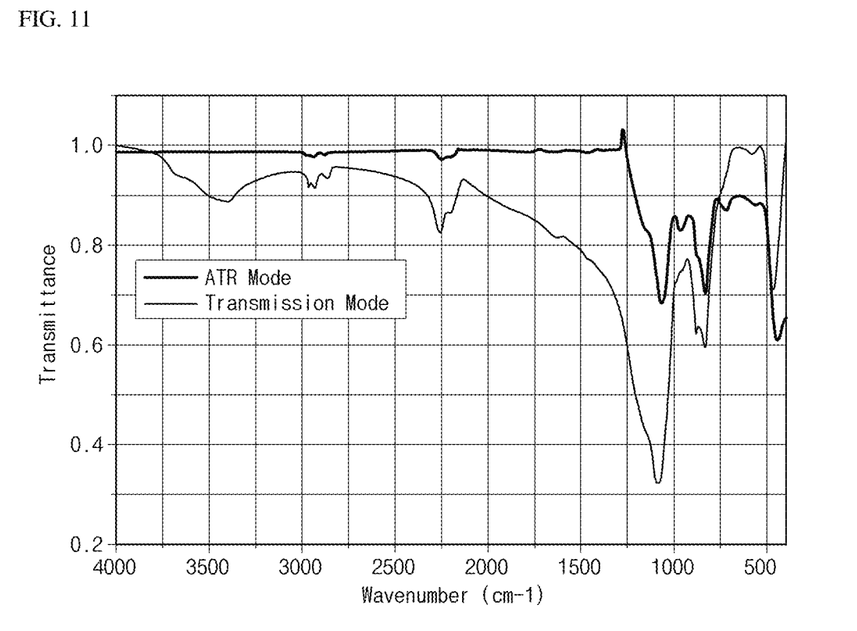
FIG. 11 is a graph of the data obtained by measuring the phosphor powder of Example 2 using an infrared spectrometer.
Figure 12:
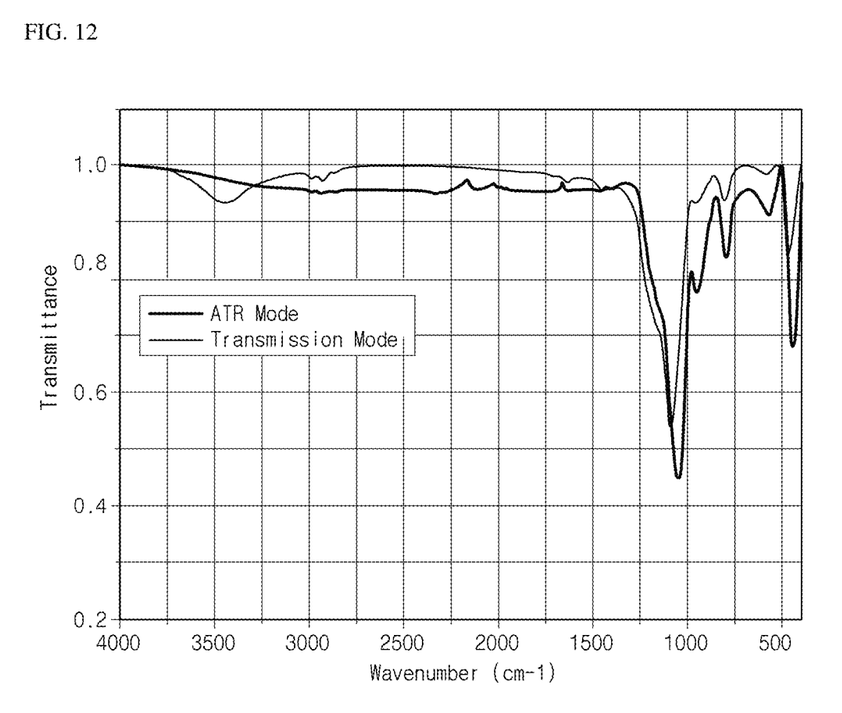
FIG. 12 is a graph of the data obtained by measuring the phosphor powder of Comparative Example 1 using an infrared spectrometer.

FIG. 11 is a graph of the data obtained by measuring the phosphor powder of Example 2 using an infrared spectrometer, and FIG. 12 is a graph of the data obtained by measuring the phosphor powder of Comparative Example 1 using an infrared spectrometer. When the spectra of the phosphor powders shown in FIGS. 11 and 12 were compared, it could be seen that the phosphor powder of Example 2 absorbed light in the vicinity of 2,250 and 840 $cm^{-1}$ due to the presence of hydrosilyl groups, but the phosphor powder of Comparative Example 1 did not absorb light in the same range of wavelengths.

The phosphor powder according to one exemplary embodiment of the present invention can protect the wavelength converting material from oxidation, bleaching and whitening and can suppress the occurrence of yellowing even when exposed to a light source for a long time, thereby preventing luminous efficiency of the wavelength converting material from being degraded. Also, the phosphor powder according to one exemplary embodiment of the present invention provides an advantage of simplifying processes since a process of hydrophilizing the wavelength converting material can be omitted and an advantage of requiring no purification process since water or a surfactant is not used.

Also, the phosphor powder according to one exemplary embodiment of the present invention provide a high physical/chemical shielding function to the wavelength converting material and thus allowing excellent characteristics including abrasion resistance, heat resistance, chemical resistance, oxidation resistance, etc.

It will be apparent to those skilled in the art that various modifications can be made to the above-described exemplary embodiments of the present invention without departing from the scope of the invention. Thus, it is intended that the present invention covers all such modifications provided they come within the scope of the appended claims and their equivalents.

What is claimed is:

1. A phosphor powder comprising:
a wavelength converting material; and
a silica-based inorganic substance surrounding the wavelength converting material and represented by the following Formula 1,
wherein the silica-based inorganic substance is derived from perhydropolysilazane, and
wherein a content of a hydrosilyl group (Si—H) is greater than or equal to 10 ppm by weight, based on the total weight of the silica-based inorganic substance:

[Formula 1]

wherein X represents oxygen (O) or an amine group (NH), Y represents hydrogen (H), a hydroxyl group (OH), or an amino group ($NH_2$).

2. The phosphor powder of claim 1, wherein the content of the wavelength converting material is in a range of 0.0001 to 95% by weight, based on the total weight of the phosphor powder.

3. The phosphor powder of claim 1, wherein the wavelength converting material comprises a lanthanide compound or a transition metal compound.

4. The phosphor powder of claim 3, wherein each of the lanthanide compound and the transition metal compound comprises at least one selected from the group consisting of a nitrate-based compound, a carbonate-based compound, a halogen-based compound, a sulfate-based compound, an oxide-based compound, a phosphate-based compound, an acetate-based compound, an acetoacetyl-based compound, and a coordinated organic compound.

5. The phosphor powder of claim 1, wherein the wavelength converting material comprises an organic phosphor.

6. The phosphor powder of claim 5, wherein the organic phosphor comprises at least one selected from the group consisting of an organic monomer, a polymer of the organic monomer, and a combination thereof, and
the organic monomer comprises at least one selected from the group consisting of an aromatic hydrocarbon, an alicyclic hydrocarbon, a halogenated hydrocarbon, an ether functional group, and a terpene functional group.

7. The phosphor powder of claim 1, wherein the wavelength converting material comprises semiconductor nanocrystals having a particle size of 2 to 40 nm.

8. The phosphor powder of claim 7, wherein the semiconductor nanocrystals comprise at least one selected from the group consisting of CdTe/CdSe, CdS(Se)/CdTe, CdS (Se)/ZnTe, CuInS(Se)/ZnS(Se), Cu(GaIn)S(Se)/ZnS(Se), ZnTe/CdS(Se), GaSb/GaAs, GaAs/GaSb, Ge/Si, Si/Ge, PbSe/PbTe, PbTe/PbSe, CdTe, CdSe, ZnTe, CuInS$_2$, CuGaS$_2$, Cu(Ga,In)S$_2$, CuGaSnS(Se), CuGaS(Se), CuSnS (Se), ZnS, CuInSe$_2$, CuGaSe$_2$, ZnSe, ZnTe, GaSb, GaAs, Ge, Si, PbSe, PbTe, and PbTe and PbSe.

9. The phosphor powder of claim 1, wherein the wavelength converting material comprises an inorganic phosphor powder.

10. The phosphor powder of claim 9, wherein the inorganic phosphor powder comprises at least one selected from the group consisting of oxide-based, halogen-based, nitrogen-based and silicate-based phosphor powders.

11. The phosphor powder of claim 1, which has a spherical shape.

12. The phosphor powder of claim 1, which has an amorphous shape.

13. The phosphor powder of claim 1, which has a particle size of 0.01 to 500 μm.

14. The phosphor powder of claim 1, wherein the wavelength converting material and the silica-based inorganic substance are bonded by a functionalized silane-based coupling agent.

15. The phosphor powder of claim 1 which has a surface made hydrophobic to be non-polar.

* * * * *